United States Patent Office 3,057,879
Patented Oct. 9, 1962

3,057,879
TETRAHYDROFURFURYL AMMONIUM COMPOUNDS AND PREPARATION THEREOF
Hans Rudolf Corrodi, Meilen, and Emil Hardegger, Lufingen, Switzerland, Fritz Kögl, Utrecht, Netherlands, and Paul Zeller, Neuallschwil, near Basel, Switzerland, assignors to Hoffmann-La Roche Inc., Nutley, N.J., a corporation of New Jersey
No Drawing. Filed Feb. 28, 1958, Ser. No. 718,132
Claims priority, application Switzerland Mar. 5, 1957
9 Claims. (Cl. 260—347.3)

The invention concerns a procedure for the preparation of tetrahydrofurfuryl ammonium compounds having acetyl choline-like activity.

The process taught by the invention for the preparation of these compounds comprises simultaneously or sequentially reducing the oxo group of 2-methyl-3-oxo-tetrahydrofuran-5-carboxylic acid or its esters to a hydroxyl group and converting the free or esterified carboxyl group to a quaternized trialkylaminomethyl group; the keto group being protected, when desired, by temporary ketalization.

The 2-methyl-3-oxo-tetrahydrofuran-5-carboxylic acid are, respectively, esters thereof, required as starting material, are in part known compounds, which can be obtained, for example, by condensation of α-iodopropionic acid esters with a malic acid ester, cyclization and decarboxylation, followed in case of need by esterification; or by addition of lactic acid esters to maleic acid esters, cyclization and decarboxylation, followed in case of need by esterification. 2-methyl - 3 - oxo-tetrahydrofuran-5-carboxylic acid methyl ester boils at 107° C./11 mm. and yields a dinitrophenylhydrazone having an unsharp melting point at 147–151° C. 2-methyl-3-oxo-tetrahydrofuran-5-carboxylic acid has the boiling point 105° C./0.01 mm. A preferred method of preparing 2-methyl-3-oxo-tetrahydrofuran-5-carboxylic acid and its methyl ester is described hereafter: 6.9 g. of sodium were pulverized in xylene. Then, 150 cc. of absolute ether were substituted for the xylene. The mixture was cooled with ice-sodium chloride, then 100 g. of distilled lactic acid ethyl ester were added dropwise. There was a strong evolution of hydrogen. The sodium compound of the lactic acid ester separated mainly in white needles. After all the sodium had reacted, 51 g. of distilled fumaric (or maleic) acid ethyl ester were added with stirring. There was almost no evolution of heat and the red-brown reaction mixture became homogeneous after ½ hour. After standing overnight the mixture was poured over a solution of 60 g. of copper acetate in 1 liter of water and the green copper complex was shaken with ether. The ether extract was thoroughly water-washed and concentrated to dryness. The residue crystallized within one day. On triturating and washing with petroleum ether the copper salt was liberated of unreacted starting materials. The product was sufficiently pure to be worked up. It was recrystallized in benzene-petroleum ether for the analysis. Melting point 177–181° C.

The copper salt was covered with ether and disintegrated with dilute sulfuric acid. By extraction with ether, 2-methyl-3-oxo-4,5-dicarbethoxy-tetrahydrofuran was obtained. After the usual working up, the residue was distilled in high vacuo. The materials having unsharp melting points between 110–125° C. were collected.

10 g. of there materials were refluxed with 40 cc. of sulfuric acid (10%) until the evolution of carbon dioxide had ceased and all material was dissolved (after about 1 hour). The solution was saturated with sodium chloride and extracted 4 times with ether. The ether extracts were washed with saturated sodium chloride solution, dried and concentrated to dryness. The residual 2-methyl-3-oxo-tetrahydrofuran-5-carboxylic acid was distilled in high vacuo for the analysis boiling point 105° C./0.01 mm. The product had a levulinic acid-like smell.

The reduction of the oxo group to the hydroxyl group can be effected, for example, by catalytic reduction with hydrogen in the presence of a nickel catalyst, e.g. Raney nickel, or by chemical reduction by means of a metal hydride, e.g. lithium aluminum hydride or sodium borohydride.

The conversion of the free or esterified carboxyl group to the quaternized aminomethyl group can be effected, according to a preferred mode of execution of the invention, by first preparing the corresponding dialkylamide, e.g. the dimethylamide; converting the latter to the corresponding tertiary amine by reduction with lithium aluminum hydride; and quaternizing the tertiary amine. A further mode of conversion which is suitable comprises reducing the acid or its ester employed as starting material to the corresponding carbinol, halogenating the latter, and reacting the halogenated product with a tertiary amine. In cases where the free or esterified carboxyl group is first converted to a quaternized amino group, it is appropriate to protect the keto group by ketalization.

According to an advantageous sequence of operations, the keto group is first reduced to the hydroxyl group and then the free or esterified carboxyl group is converted to the quaternized amino group.

A further mode of execution comprises first ketalizing the keto group, e.g. by reaction with orthoformic acid ester in the presence of a trace of sulfuric acid; then converting the free or esterified carboxyl group to the corresponding ketal amide, according to methods known per se, by reaction with a secondary amine; hydrolyzing the ketal group to the free keto group by means of acid; reducing the thus obtained ketone amide to the N-substituted 2-methyl-3-hydroxy-5-aminomethyl-tetrahydrofuran; and quaternizing the latter. The conversion of the ketal amide to the N-substituted 2-methyl-3-hydroxy-5-aminomethyl-tetrahydrofuran can also be effected by reducing the acid amide group of the ketal amide to the N-substituted aminomethyl group, hydrolyzing the ketal group to the free keto group, and reducing the thus obtained N-substituted 2-methyl - 3 - oxo-5-aminomethyl-tetrahydrofuran to the N-substituted 2-methyl-3-hydroxy-5-aminomethyl-tetrahydrofuran, quaternization then following. According to another variant of this last mode of execution, one can also first quaternize the N-substituted 2-methyl-3-oxo-5-aminomethyl-tetrahydrofuran and then reduce the keto group.

The tetrahydrofurfuryl ammonium salts which can be obtained according to the process of the invention possess the following general Formula I:

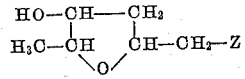

wherein Z represents a quaternized amino group. Especially preferred compounds of the above formula are those in which Z represents a quaternized trialkylamino group, especially a trimethylamino group. The end products of the invention are advantageously provided with such anions as are customarily employed in pharmaceutical preparations, e.g. chloride, bromide, sulfate or phosphate ions.

The products obtained according to the invention are in part hygroscopic materials, which can be converted to their crystalline chloraurates, reineckates or tetraphenylboronates for purposes of isolation or purification. From these crystalline salts can be obtained the desired pharmaceutically useful salts by treatment with the corresponding acids.

Since the molecules of the end products of the processes of the invention contain three asymmetric carbon atoms, there are possible eight stereoisomeric forms. The products obtained according to the processes of the invention contain various of such forms. They can be separated from each other in conventional manner, e.g. by fractional crystallization. It has been determined that one of these stereoisomeric forms is identical with the active principle of fly agaric, muscarine.

The end products of general Formula I are useful as parasympathomimetic agents, in view of their muscarinic action.

The invention is further disclosed in the following examples which are illustrative but not limitative thereof.

*Example 1*

7.9 g. of 2-methyl-3-oxo-tetrahydrofuran-5-carboxylic acid methyl ester was catalytically hydrogenated at room temperature and under atmospheric pressure in 50 cc. of methanol in the presence of 3 g. of Raney nickel hydrogenation catalyst. When the uptake of hydrogen ceased (after about four hours), the catalyst was filtered off and the filtrate was concentrated. The residue, 2-methyl-3-hydroxy-tetrahydrofuran-5-carboxylic acid methyl ester, was a colorless oil and was purified by distillation in high vacuum, B.P. 110° C./0.05 mm. 2 g. of this ester was heated in an autoclave for 12 hours at 100° C. with 10 cc. of a 33% solution of dimethylamine in alcohol. The alcohol was then driven off, leaving a residue of brownish colored oil, which was freed of unreacted starting material by washing with ether. For further purification, the thus obtained 2-methyl-3-hydroxy-tetrahydrofuran-5-carboxylic acid dimethylamide was distilled in high vacuum, B.P. 135° C./0.01 mm. 2 g. of the above amide was dissolved in 10 cc. of absolute dioxan and added dropwise to a suspension of 1.5 g. of lithium aluminum hydride in 100 cc. of absolute ether. When the addition was finished, the reaction mixture was refluxed for 2 hours and then 30% potassium hydroxide solution was added dropwise to excess. By extracting thoroughly with ether there was obtained 1.2 g. of 2-methyl-3-hydroxy-5-dimethylaminomethyl-tetrahydrofuran as a strongly basic oil, which was purified by distillation in high vacuum, B.P. 100–105° C./0.01 mm. 1 g. of this base was dissolved in 5 cc. of ether and mixed with 1 g. of methyl iodide, whereupon an oil immediately began to precipitate, which after standing for several hours crystallized in part. The salt was filtered off and washed with ether and was reacted in methanol with an aqueous suspension of silver chloride. After two hours the reaction mixture was filtered and the filtrate was evaporated. The residue, [(2-methyl-3-hydroxy-tetrahydrofuran-5-yl)-methyl]-trimethylammonium chloride was characterized by reaction with sodium tetraphenylboronate in water, whereupon there was formed a crystalline precipitate of [(2-methyl-3-hydroxy-tetrahydrofuran-5-yl)-methyl]-trimethylammonium tetraphenylboronate, which after recrystallization from methanol melted at 152° C. By fractional crystallization of this product from methanol, there were isolated racemates having melting points at 203° C., 170° C. and 168° C.

*Example 2*

2 g. of 2-methyl-3-oxo-tetrahydrofuran-5-carboxylic acid methyl ester was dissolved in 30 cc. of methanol and cooled to 0° C. While continuing the cooling, 1 g. of sodium borohydride was added slowly. The reaction mixture was allowed to stand for 12 hours at 5° C., then the methanol was distilled off, the reaction mixture was acidified with hydrochloric acid, saturated with sodium chloride and extracted with ether. The ether was distilled off from the extract, leaving a residue of 1.2 g. which was distilled through a bulbed tube, B.P. 100° C./0.01 mm. The 2-methyl-3-hydroxy-tetrahydrofuran-5-carboxylic acid methyl ester thus obtained was worked up further according to Example 1.

*Example 3*

2 g. of 2-methyl-3-oxo-tetrahydrofuran-5-carboxylic acid methyl ester was dissolved in 4 cc. of orthoformic acid methyl ester and the solution was mixed with 2 drops of concentrated sulfuric acid. A small amount of heat was liberated slowly. After standing for 2 hours at room temperature the reaction mixture was neutralized with saturated sodium bicarbonate solution and the ketal formed was extracted with ether. The ethereal extract was evaporated and the residue was distilled in high vacuum. 2-methyl-3,3-dimethoxy-tetrahydrofuran-5-carboxylic acid methyl ester thus obtained was a colorless and almost odorless oil having B.P. 121° C./1 mm. Yield: 85%.

2 g. of 2-methyl-3,3-dimethoxy-tetrahydrofuran-5-carboxylic acid methyl ester was heated in a bomb for 12 hours at 120° C. with 10 cc. of 33% alcoholic solution of dimethylamine. The solvent was distilled off and the light yellow reaction product was distilled in high vacuum. 2-methyl-3,3-dimethoxy-5-dimethylaminocarbonyl-tetrahydrofuran thus obtained boiled at 140° C./0.01 mm.

2 g. of this diketal was allowed to stand for 2 hours at room temperature with 20 cc. of 2.5% sulfuric acid. In order to remove unreacted 2-methyl-3-oxo-tetrahydrofuran-5-carboxylic acid methyl ester, the aqueous solution was extracted with ether. The sulfuric acid was removed from the aqueous portion by addition of barium carbonate and filtration, and the aqueous filtrate was evaporated in vacuo to dryness. The residual 2-methyl-3-oxo-5-dimethylaminocarbonyl-tetrahydrofuran was distilled in high vacuum, B.P. 140° C./0.01 mm. This ketoamide formed a dinitrophenylhydrazone, which crystallized from chloroform-methanol in orange colored leaflets having M.P. 195° C.

A solution of 1 g. of 2-methyl-3-oxo-5-dimethylaminocarbonyl-tetrahydrofuran in tetrahydrofuran was added dropwise to a suspension of 1 g. of lithium aluminum hydride in absolute ether. In order to complete the reaction, the mixture was refluxed for three hours. Then dilute hydrochloric acid was added and the ethereal solution was shaken several times with a small amount of hydrochloric acid. The combined acidic solutions were mixed with concentrated potassium hydroxide solution and the liberated 2-methyl-3-hydroxy-5-dimethylaminomethyl-tetrahydrofuran was isolated by saturating with sodium chloride, extracting several times with ether, and concentration of the combined ethereal extracts. The crude product (0.6 g.) was distilled in high vacuum; B.P. 100° C./0.01 mm. The thus obtained 2-methyl-3-hydroxy-5-dimethylaminomethyl-tetrahydrofuran was quaternized by means of methyl iodide in ether according to the method disclosed in Example 1 to produce [(2-methyl-3-hydroxy-tetrahydrofuran-5-yl)-methyl]-trimethylammonium iodide, melting at 178° C. The corresponding tetraphenylboronate melted at 170° C. By reacting the quaternary iodide with silver chloride the hygroscopic chloride was formed, which after recrystallization from isopropanol/methyl ethyl ketone melted at 163–165° C.

*Example 4*

8 g. of 2-methyl-3,3-dimethoxy-5-dimethylaminocarbonyl-tetrahydrofuran (obtained according to Example 3) was reduced in 250 cc. of absolute ether by means of 4 g. of lithium aluminum hydride. The reaction mixture was refluxed for two hours and then was mixed with hydrochloric acid. The ethereal layer was separated and was extracted several times with dilute hydrochloric acid. The combined aqueous solutions were allowed to stand for an additional hour at room temperature in order to hydrolyze the dimethyl ketal, then the mixture was reacted with concentrated potassium hydroxide solution to a strongly alkaline end point, saturated with sodium chloride and extracted to exhaustion with ether. The ether was distilled from the extract, and the residual brown oil was distilled in high vacuum. There was thus obtained 2-methyl-3-oxo-5-dimethylaminomethyl-tetrahydrofuran having B.P. 90° C./0.01 mm. The distillate, in five times its volume of ether, was mixed with an equal volume of methyl iodide, whereupon [(2-methyl-3-oxo-tetrahydrofuran-5-yl)-methyl]-trimethylammonium iodide crystallized. This iodide crystallized in acetone in the form of prisms of melting point 140° C.; the corresponding tetraphenylboronate crystallized in acetone/methanol in the form of crystals melting at 181° C. 0.13 g. of this ammonium salt was dissolved in 3 cc. of isopropanol and was allowed to stand for 12 hours with a solution of 0.1 g. of sodium borohydride in 3 cc. of isopropanol. The reaction mixture was acidified with acetic acid and then the solvent was driven off. The residue was dissolved in water and mixed with a solution of 0.2 g. of sodium tetraphenylboronate in 3 cc. of water, whereupon [(2-methyl-3-hydroxy-tetrahydrofuran-5-yl)-methyl]-trimethylammonium tetraphenylboronate precipitated, which after recrystallization from acetone/methanol formed needle-like crystals melting at 170° C.

*Example 5*

2 g. of 2-methyl-3,3-dimethoxy-tetrahydrofuran-5-carboxylic acid methyl ester (obtained according to Example 3) was added dropwise to a suspension of 0.3 g. of lithium aluminum hydride in absolute ether, and the mixture was refluxed for three hours. Then potassium hydroxide solution was added, the aqueous layer was separated and saturated with sodium chloride and then was extracted to exhaustion with ether. The combined ethereal extracts were freed of ether by distillation and the residue of 2-methyl-3,3-dimethoxy-5-hydroxymethyl-tetrahydrofuran was distilled; B.P. 110° C./0.01 mm. (through a bulbed tube). 0.5 g. of this hydroxy ketal was dissolved in 5 cc. of benzene and was mixed with 0.5 cc. of thionyl chloride. The reaction mixture was allowed to stand for one hour and then the brown solution was evaporated in vacuo and the residue of 2-methyl-3,3-dimethoxy-5-chloromethyl-tetrahydrofuran was dissolved in benzene. The resulting solution was mixed while cooling with a mixture of 1 cc. of trimethylamine and 3 cc. of benzene. The mixture was allowed to stand for one day at room temperature. Then the mother liquor was poured off of the precipitated [(2-methyl-3,3-dimethoxy-tetrahydrofuran-5-yl)-methyl]-trimethylammonium chloride and the residue was taken up in 5 cc. of N hydrochloric acid in order to hydrolyze the ketal group. The thus obtained solution of [(2-methyl-3-oxo-tetrahydrofuran-5-yl)-methyl]-trimethylammonium chloride was decolorized by treatment with activated carbon and then was reduced with sodium borohydride, similarly to Example 4. In order to isolate the [(2-methyl-3-oxo-tetrahydrofuran-5-yl)-methyl]-trimethylammonium salt, the solution obtained was mixed with a solution of 0.7 g. of sodium tetraphenylboronate in 5 cc. of water, thereby producing the corresponding tetraphenylboronate, which after recrystallization from methanol melted at 182° C.

*Example 6*

5 g. of 2-methyl-3,3-dimethoxy-5-hydroxymethyl-tetrahydrofuran (obtained according to Example 5) were dissolved in 20 cc. of pyridine and treated with 7.5 g. of p-toluene sulfochloride. The mixture was allowed to stand for 2 hours at room temperature, then saturated sodium bicarbonate solution was added and the product formed was extracted with ether. On concentrating the ether extract 8.5 g. of crude 2-methyl-3,3-dimethoxy-5-toluenesulfonyloxymethyl-tetrahydrofuran were obtained. This product was given to 9 g. of sodium iodide in 50 cc. of acetone and kept for 1 hour at 100° C. in a pression flask. Then, the salt that separated was filtered off, the filtrate was concentrated to dryness and the residue was distributed between water and ether. From the ether solution there was obtained 2-methyl-3,3-dimethoxy-5-iodomethyl-tetrahydrofuran as an unstable, brownish oil, of melting point 70° C./0.01 mm. This product was heated for 1 hour at 100° C. in an autoclave with a solution of trimethylamine in benzene (30%). After cooling, the precipitated trimethylamine hydroidide was filtered off. The filtrate contained [(2-methyl-3,3-dimethoxy-tetrahydrofuran-5-yl)-methyl]-trimethylammonium iodide; the corresponding tetraphenylboronate melted at 181° C. The hydrolysis of the ketal was carried out with 0.1-N sulfuric acid; the [(2-methyl-3-oxo-tetrahydrofuran-5-yl)-methyl]-trimethylammonium tetraphenylboronate melted at 196° C. after recrystallization from methanol. The reduction of the keto group may be carried out by treatment with sodium borohydride in water.

*Example 7*

1 g. of 2-methyl-3,3-dimethoxy-5-toluenesulfonyloxymethyl-tetrahydrofuran (obtained according to Example 6) was heated to 100° C. in a bomb with 10 cc. of a 30% solution of trimethylamine in benzene. On cooling [(2-methyl-3,3-dimethoxy-tetrahydrofuran-5-yl)-methyl]-trimethylammonium toluenesulfonate crystallized out as fine leaflets. Melting point 153° C. after recrystallization from methanol-ethyl acetate. The corresponding tetraphenylboronate melted at 159° C. The ketal was hydrolyzed by heating for 30 minutes in a steam bath with 0.1-N sulfuric acid and the tetraphenylboronate was isolated. The two-compound-mixture obtained consists of 70% of tetraphenylboronate melting at 179° C. and of 30% of the same compound melting at 196° C. The latter compound was worked up according to Example 6.

The tetraphenylboronate melting at 179° C. was treated with cesium chloride in methanolic solution, the carbonyl group was reduced with sodium borohydride and the [(2-methyl-3-hydroxytetrahydrofuran-5-yl)-methyl]-trimethylammonium chloride obtained was isolated; melting point 165° C. The corresponding chloroaurate melted at 87° C. after recrystallization from methanol-water.

We claim:

1. A process which comprises reducing 2-methyl-3-oxo-tetrahydrofuran-5-carboxylic acid lower alkyl ester by reaction with a member selected from the group consisting of catalyzed elemental hydrogen and a metal hydride, thereby forming 2-methyl-3-hydroxy-tetrahydrofuran-5-carboxylic acid lower alkyl ester; reacting the latter with a di(lower alkyl) amine, thereby forming 2-methyl-3-hydroxy-5-di(lower alkyl)aminocarbonyl-tetrahydrofuran; reducing the latter by reaction with a member selected from the group consisting of catalyzed elemental hydrogen and a metal hydride, thereby forming 2-methyl-3-hydroxy-5-di(lower alkyl)aminomethyl-tetrahydrofuran; and quaternizing the latter by reaction with a lower alkyl halide.

2. A process which comprises ketalizing 2-methyl-3-oxo-tetrahydrofuran-5-carboxylic acid lower alkyl ester by reaction with orthoformic acid lower alkyl ester; reacting the resulting ketal with di(lower alkyl)amine, thereby forming a ketal of 2-methyl-3-oxo-5-di(lower alkyl)aminocarbonyl-tetrahydrofuran; hydrolyzing the ketal grouping in the latter by reaction with acid, thereby forming 2-methyl-3-oxo-5-di(lower alkyl) aminocarbonyl-tetrahydrofuran; reducing the latter by reaction with a member selected from the group consisting of catalyzed elemental hydrogen and a metal hydride, thereby forming 2-methyl-3-hydroxy-5-di(lower alkyl)aminomethyl-tetrahydrofuran; and quaternizing the latter by reaction with a lower alkyl halide.

3. A process which comprises ketalizing 2-methyl-3-oxo-5-di(lower alkyl)aminocarbonyl-tetrahydrofuran by reaction with orthoformic acid lower alkyl ester; reducing the resulting ketal by reaction with a member selected from the group consisting of catalyzed elemental hydrogen and a metal hydride, thereby forming a ketal of 2-methyl-3-oxo-5-di(lower alkyl)aminomethyl-tetrahydrofuran; hydrolyzing the ketal grouping in the latter by reaction with acid, thereby forming 2-methyl-3-oxo-5-di(lower alkyl)aminomethyl-tetrahydrofuran; quaternizing the latter by reaction with a lower alkyl halide; and reducing the quaternized product by reaction with a member selected from the group consisting of catalyzed elemental hydrogen and a metal hydride, thereby forming a lower alkyl quaternary salt of 2-methyl-3-hydroxy-5-di-(lower alkyl)aminomethyl-tetrahydrofuran.

4. A process which comprises ketalizing 2-methyl-3-oxo-tetrahydrofuran-5-carboxylic acid lower alkyl ester by reaction with orthoformic acid lower alkyl ester; reducing the latter by reaction with a member selected from the group consisting of catalyzed elemental hydrogen and a metal hydride, thereby forming a ketal of 2-methyl-3-oxo-5-hydroxymethyl-tetrahydrofuran; reacting the latter with a halogenating agent, thereby producing a ketal of 2-methyl-3-oxo-5-halomethyl-tetrahydrofuran; reacting the latter with a tri(lower alkyl) amine; hydrolyzing the ketal grouping in the quaternary product by reaction with acid, thereby forming [(2-methyl-3-oxo-tetrahydrofuran-5-yl)-methyl]-tri(lower alkyl) ammonium halide; and reducing the latter by reaction with a member selected from the group consisting of catalyzed elemental hydrogen and a metal hydride, thereby forming [(2-methyl-3-hydroxy-tetrahydrofuran - 5 - yl) - methyl] - tri(lower alkyl)ammonium halide.

5. A compound of the formula

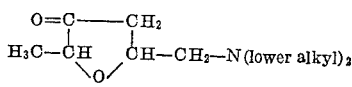

6. A compound of the formula

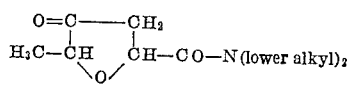

7. A compound of the formula

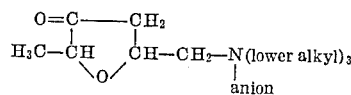

wherein the anion is a pharmaceutically acceptable anion.

8. A compound of the formula

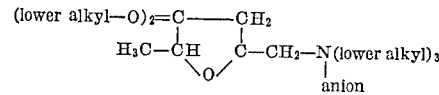

wherein the anion is a pharmaceutically acceptable anion.

9. A compound of the formula

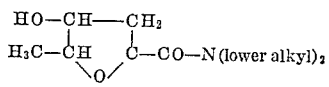

References Cited in the file of this patent

UNITED STATES PATENTS 2,185,220    Nabenhauer _____ Jan. 2, 1940

OTHER REFERENCES

Henecka: Chem. Abstrs., vol. 31, pages 5792–3 (1937).

Brown: Organic Reactions, vol. 6 (1951), page 479 (John Wiley & Sons, Inc, pub.).

Dunlop: The Furans, A.S.C. Monograph No. 119 (1953), page 527 (Reinhold Pub. Co., NY.).

Eugster et al.: Helv. Chim. Acta, vol. 39 (1956), pages 1002–1037 (pages 1031–7 relied on).

Gaylord: Reduction with Complex Metal Hydrides (1956), page 544.

Migrdichian: Organic Syntheses (1957), vol. I, pages 194–203, page 202 especially relied on.

Kogl et al.: Rec. Trav. Chim., vol 76, pages 109–27 (January 1957).